(12) United States Patent
Coronel et al.

(10) Patent No.: US 8,086,248 B2
(45) Date of Patent: Dec. 27, 2011

(54) ESTIMATING LOCATION USING MULTI-ANTENNA RADIO RECEIVER

(75) Inventors: Pedro E. Coronel, Zurich (CH); Wolfgang H. Schott, Rueschlikon (CH); Beat Weiss, Edlibach (CH)

(73) Assignee: International Business Machines Corporation, Armonk, NY (US)

( * ) Notice: Subject to any disclaimer, the term of this patent is extended or adjusted under 35 U.S.C. 154(b) by 878 days.

(21) Appl. No.: 12/121,916

(22) Filed: May 16, 2008

(65) Prior Publication Data

US 2009/0286548 A1    Nov. 19, 2009

(51) Int. Cl.
*H04W 24/00* (2009.01)
*H04M 11/04* (2006.01)

(52) U.S. Cl. .................. 455/456.1; 455/404.2
(58) Field of Classification Search ............. 455/456.1
See application file for complete search history.

(56) References Cited

U.S. PATENT DOCUMENTS

| | | |
|---|---|---|
| 2006/0217132 A1* | 9/2006 | Drummond-Murray et al. ............. 455/456.2 |
| 2008/0004796 A1 | 1/2008 | Schott et al. |

FOREIGN PATENT DOCUMENTS

WO  WO 2004/017569  2/2004

OTHER PUBLICATIONS

Z. Xiang et al., "A wireless LAN-based indoor positioning technology"; IBM J. Res. & Dev. vol. 48 No. 5/6, Sep./Nov. 2004.

G. V. Zaruba, "Indoor location tracking using RSSI readings from a single Wi-Fi access point"; Wireless Netw (2007) 13:221-235; published online: Jun. 8, 2006; copy right Springer + Business Media, LLC 2007.

William S. Murphy, Jr. et al., "Determination of a Position in Three Dimensions Using Trilateration and Approximate Distances", Nov. 28, 1999.

* cited by examiner

*Primary Examiner* — Patrick Edouard
*Assistant Examiner* — Huy Ho
(74) *Attorney, Agent, or Firm* — Ryan, Mason & Lewis, LLP

(57) ABSTRACT

Packets are periodically transmitted by a plurality of radio beacons deployed at known positions over a location estimation area. Monitoring is conducted for incoming packets. Upon receipt of a packet from a $k^{th}$ one of the beacons, received signal strength, RSSI, is measured at each of the antenna outputs, the packet is decoded to obtain the unique identifier and the unique sequence number, and the received signal strength at each of the antenna outputs is spatially averaged. The measuring, decoding, and spatial averaging are repeated for additional packets from the $k^{th}$ one of the beacons during a pre-defined time window T. The plurality of spatially averaged received signal strengths are temporally averaged over the pre-defined time window T, to obtain a spatially and temporally averaged value of received signal strength. The distance $d_k$ from the apparatus to the $k^{th}$ one of the beacons is approximated based on the spatially and temporally averaged value of received signal strength. The approximate distance $d_k$ is designated as $\hat{d}_k$. This is repeated for the K beacons that have successfully transmitted packet(s) during the pre-defined time window, k=1 to K. The location of the object is estimated as an approximate intersection of spheres with radii $\hat{d}_k$. Each sphere is centered at the known position of the $k^{th}$ one of the beacons.

15 Claims, 5 Drawing Sheets

ESTIMATING LOCATION USING MULTI-ANTENNA RADIO RECEIVER

FIELD OF THE INVENTION

The present invention relates to the electrical, electronic and computer arts, and, more particularly, to location estimation and the like.

BACKGROUND OF THE INVENTION

Location sensing of slowly moving objects in an indoor environment has created a growing interest in location-aware services and applications in various market segments. In the retail industry, for example, shopping carts equipped with a personal shopping assistant enriched with some additional location positioning functionality can guide customers through a store, provide them with location-based product information, and alert them to promotions and discounts as they walk through the aisles. However, customer satisfaction, and thereby the success of this advanced shopping service, depends on the achievable position accuracy.

Location tracking of mobile objects in an indoor environment can be performed with various techniques, based on mechanical, acoustical, ultra-sonic, optical, infrared, inertial, or radio-signal measurements. Among these systems, radio-based location positioning systems are most frequently used to sense and track the position of moving objects in an indoor environment. A radio receiver attached to the objects measures the signal strength, the angle of arrival, or the arrival-time difference of received radio signals that are transmitted by multiple pre-installed reference transponder units. Since the locations of the radio transponders are known, a triangulation or signature method can be applied to determine the physical location of the moving object. As far as the radio technology is concerned, the wireless personal-area and network technology as specified by the IEEE 802.15.x standardization body and the ZigBee Alliance, of San Ramon, Calif., USA, are well-suited for obtaining low-cost implementations. However, wireless local area network (WLAN) technology can also be very attractive in buildings where an infrastructure is already deployed.

The location position estimates obtained from radio signal strength measurements in a location positioning system using single-antenna radio transceivers are reliable and stable in the long term, but suffer from a large error variance due to the fading radio channel. According to theory, a good signal strength estimate can be computed in the radio receiver by averaging N signal strength samples taken every $T_s$ seconds. Upon application of the strong law of large numbers, this sample mean converges to the statistical average of the received signal power with probability 1 as $N \to \infty$, if the input signal are uncorrelated, the noise is white, and the channel correlation vanishes with increasing time lag. In a typical indoor environment, however, the wireless channel changes very slowly, i.e. the channel coherence time is large. Consequently, subsequent channel gains are highly correlated and averaging has to be performed over a large number, N, of samples to yield an estimate very close to the real signal strength value. Therefore, position estimates derived from signal strength measurements with a single-antenna receiver can only be updated rather infrequently and are not well-suited for tracking the location position of a moving object.

SUMMARY OF THE INVENTION

Principles of the present invention provide techniques for estimating location using a multi-antenna radio receiver. In one aspect, an exemplary apparatus is provided for estimating location of an object by monitoring radio packets. The packets are periodically transmitted by a plurality of radio beacons deployed at known positions over a location estimation area. The packets include (i) an identifier unique to a given one of the beacons and (ii) a unique sequence number. The apparatus includes a plurality of antennas. Each of the antennas has an output. The apparatus also includes a memory, and at least one processor, coupled to the memory and the antenna outputs. The processor is operative to carry out the following steps for k=1 to K: monitor for incoming ones of the packets; upon receipt of a packet from a $k^{th}$ one of the beacons: measure received signal strength, RSSI, at each of the antenna outputs; decode the packet to obtain the unique identifier and the unique sequence number; and spatially average the received signal strength at each of the antenna outputs; repeat the measuring, decoding, and spatial averaging steps for a plurality of additional packets from the $k^{th}$ one of the beacons during a pre-defined time window T, to obtain a plurality of spatially averaged received signal strengths; temporally average the plurality of spatially averaged received signal strengths over the pre-defined time window T, to obtain a spatially and temporally averaged value of received signal strength; and approximate a distance $d_k$ from the apparatus to the $k^{th}$ one of the beacons based on the spatially and temporally averaged value of received signal strength. The approximate distance $d_k$ is designated as $\hat{d}_k$. The processor is further operative to estimate the location as an approximate intersection of spheres with radii $\hat{d}_k$. Each sphere is centered at the known position of the $k^{th}$ one of the beacons. K is at least two in a case where the object is constrained to move in a single spatial dimension, K is at least three in a case where the object is constrained to move in two spatial dimensions, and K is at least four in a case where the object is free to move in three spatial dimensions. K is the number of beacons that have successfully transmitted one or more of the radio packets to the object during the time window T.

In another aspect, an exemplary method (which can be computer implemented) for estimating location of an object includes securing to the object an apparatus of the kind described and using the same to monitor the location of the object.

One or more embodiments of the invention or elements thereof can be implemented in the form of a computer program product including a computer usable medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

One or more embodiments of the invention may offer one or more technical benefits; for example, accurately estimating the position of an object, such as a relatively slowly moving object, in an indoor environment.

These and other features, aspects and advantages of the present invention will become apparent from the following detailed description of illustrative embodiments thereof, which is to be read in connection with the accompanying drawings.

DETAILED DESCRIPTION OF PREFERRED EMBODIMENTS

Aspects of the invention provide techniques for accurately measuring the position of a mobile object in an indoor environment. The location estimates can be derived from received signal strength measurements of radio signals that are transmitted by radio beacons deployed at known location positions in the building. Accurate location estimates are obtained by averaging, not only in time, but also in space, the signal strength measurements made in a multi-antenna radio receiver. One or more embodiments take into account spatial constraints given by the floor plan of the building. The object is preferably static or slowly moving. A multi-antenna radio receiver can be mounted to the object.

Figure 1:
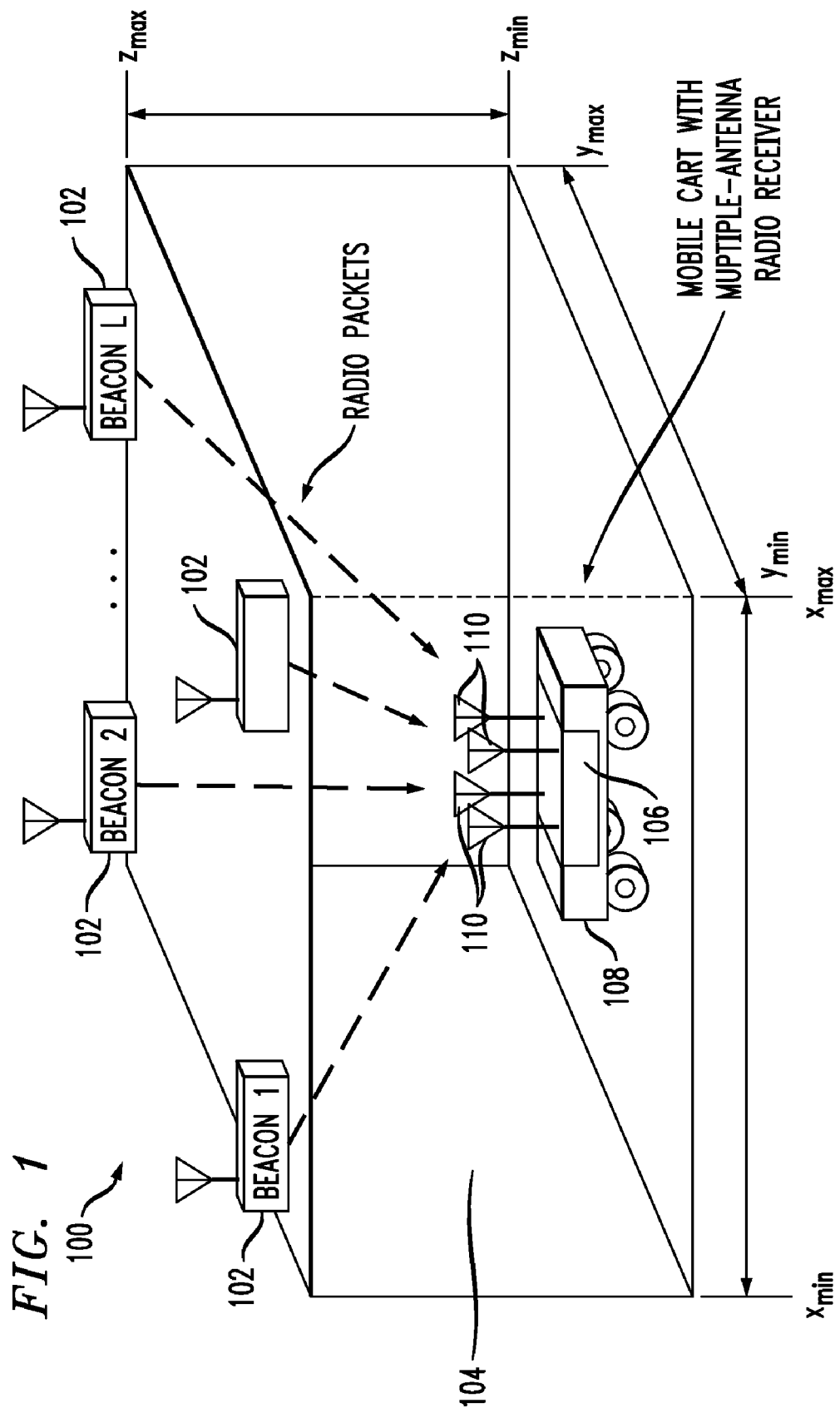
FIG. 1 depicts an exemplary embodiment of a wireless location positioning system, according to an aspect of the invention.

With reference to FIG. 1, in one aspect, a wireless location positioning system 100 is disclosed, where L radio beacons 102 are deployed at known positions over the location estimation area 104. Each beacon 102 periodically transmits a radio packet containing its identifier and a unique sequence number, as will be discussed below with regard to FIG. 2. A multi-antenna radio receiver 106 mounted on a cart 108 continuously listens for incoming packets. When it receives a packet from a $k^{th}$ one of the beacons, the receiver measures the received signal strength RSSI at each antenna output and decodes the packet to retrieve the originator's identifier and the packet number. An accurate mean value $\overline{RSSI}_k$ is calculated by, firstly, spatially averaging the signal strength measurements obtained for the same packet at the output of each antenna and, secondly, temporally averaging the resulting RSSI measurements of packets that have been received from the same beacon k within a pre-defined time window T. The averaged received signal strength indicator is used to approximate the distance $d_k$ of the mobile unit 108 to the corresponding beacon by $\hat{d}_k$, where the approximation is based on an exponential path loss model of the radio channel. If the mobile unit has decoded radio packets from at least four different beacons 102 within the time window T, the position of the mobile unit is given as the intersection of spheres centered on the packet originator position with radius $d_k$. Since only approximate distances $\hat{d}_k$ are available, the spheres do not all intersect on a single point. Therefore, an iterative search technique can be applied, which finds the location by minimizing the mean square error between the exact and approximate distances. The iterative search method allows the inclusion of spatial constraints, such as those given by the floor plan of the building.

Thus, system 100 includes a mobile object (e.g. mobile cart 108) that is located at an unknown position (x,y,z) within a given location area of a building, as well as L radio beacons 102 that are deployed at known reference positions $(x_l, y_l, Z_l)$, l=1,K,L, over the area of interest. The area can be an open floor of the building or a spatial sub-area of the floor such as a room, aisle, and the like. In the latter case, the location position of the mobile object must lie within the coordinates $x_{min} \leq x \leq x_{max}$, $y_{min} \leq y \leq y_{max}$, and $z_{min} \leq z \leq z_{max}$, where the boundaries are given by the floor plan of the building and the height of the radios above the ground plane. Note that the size of the coordinate system can be reduced to two dimensions if the mobile object moves on a flat floor. Other constraints are possible; for example, it might be desirable to track objects that are tethered, move on a conveyor belt system, and so on.

Figure 2:
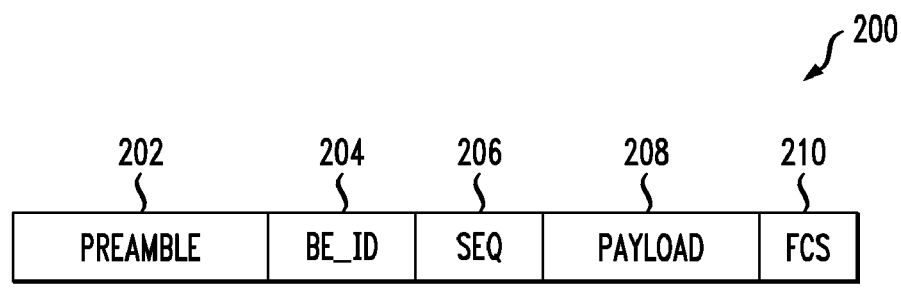
FIG. 2 depicts exemplary frame format of transmitted radio packets, according to another aspect of the invention.

Each beacon 102 includes a radio transmitter with a single antenna that periodically broadcasts a radio packet. As shown in FIG. 2, each exemplary packet 200 contains a preamble sequence 202, the beacon identifier BE_ID 204, a unique packet sequence number SEQ 206, and further information elements such as payload 208, frame check sum (FCS) 210, and the like, as required for receiving and decoding radio packets according to the chosen radio technology. The skilled artisan, given the teachings herein, can select one or more radio techniques to implement aspects of the invention.

Figure 3:
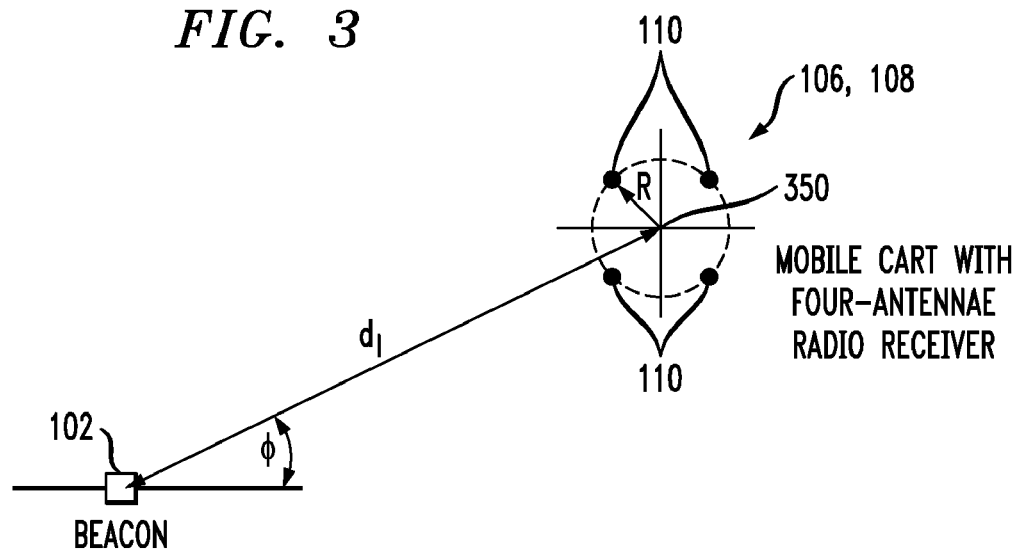
FIG. 3 depicts a geometrical arrangement of a single antenna beacon and mobile cart with uniform circular antenna array, according to yet another aspect of the invention.

On the mobile object, such as the cart 108, a multiple-antenna radio receiver 106 is mounted, which continuously listens for incoming packets 200. The antennae 110 form an M-element uniform circular antenna array, as best seen in FIG. 3, where M=4. The antenna spacing is set to half of the carrier wavelength of the received radio signals, to optimize the performance of the location positioning scheme. If the distance between the beacon l 102 and the mobile object 108 is much larger than the size R of the antenna array, the squared distance $d_l^2$ between the beacon l 102 and the center 350 of the array is given by the mean over the squared distances $d_{l,m}^2$ between the beacon l and the m-th antenna element, as follows:

$$d_l^2 = \frac{1}{M} \sum_{m=1}^{M} d_{l,m}^2 - R^2 \qquad (1)$$

Note that the distance $d_l$ does not depend on the directional angle φ of the antenna array.

Figure 4:
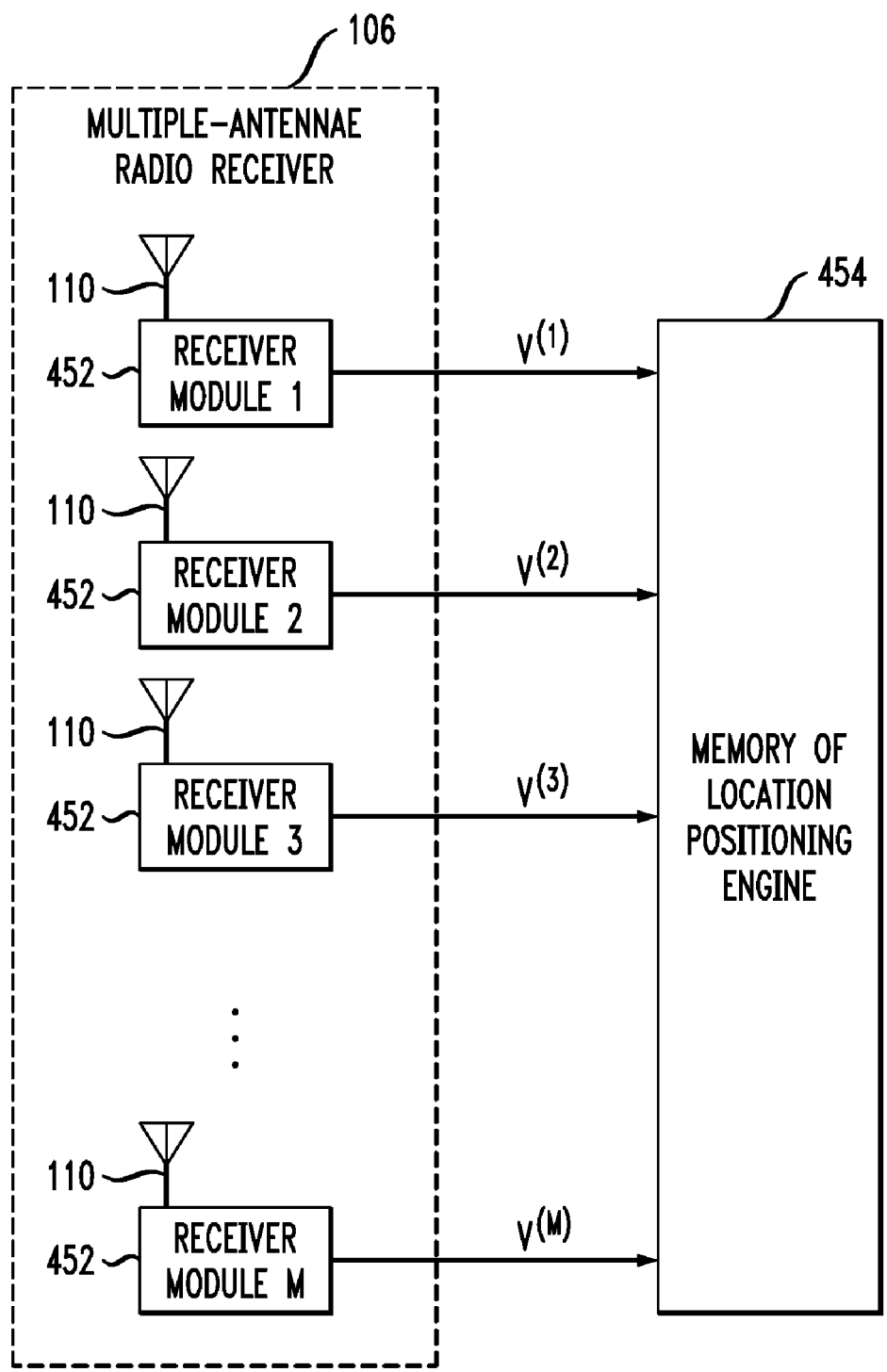
FIG. 4 depicts an exemplary multiple antenna radio receiver, according to still another aspect of the invention.

As shown in FIG. 4, each antenna 110 of the M-element antenna array is attached to a receiver module 452 that continuously receives incoming packets 200. Each module m, m=1,K,M, measures for each incoming packet 200 the received signal strength RSSI in decibels by averaging the signal amplitude of the incoming preamble symbols and the link quality indicator LQI by correlating the received preamble with the known reference preamble pattern. If the parameters RSSI and LQI indicate good reception quality, the packet 200 is decoded to retrieve the identifier BE_ID 204 of the originating beacon 102, and the packet sequence number SEQ 206. Parameters which are derived from packets 200 that cannot be decoded due to check sum failure are discarded. Finally, the retrieved parameter vector, $v^{(m)}$=[BE_ID, SEQ, RSSI, LQI]$^T$, of each successfully decoded radio packet is forwarded through an interface to the memory 454 of the location positioning engine. Of course, appropriate demodulation and downconversion functionality can be present as needed; the skilled artisan, given the teachings herein, can implement the required functionality.

Figure 5:
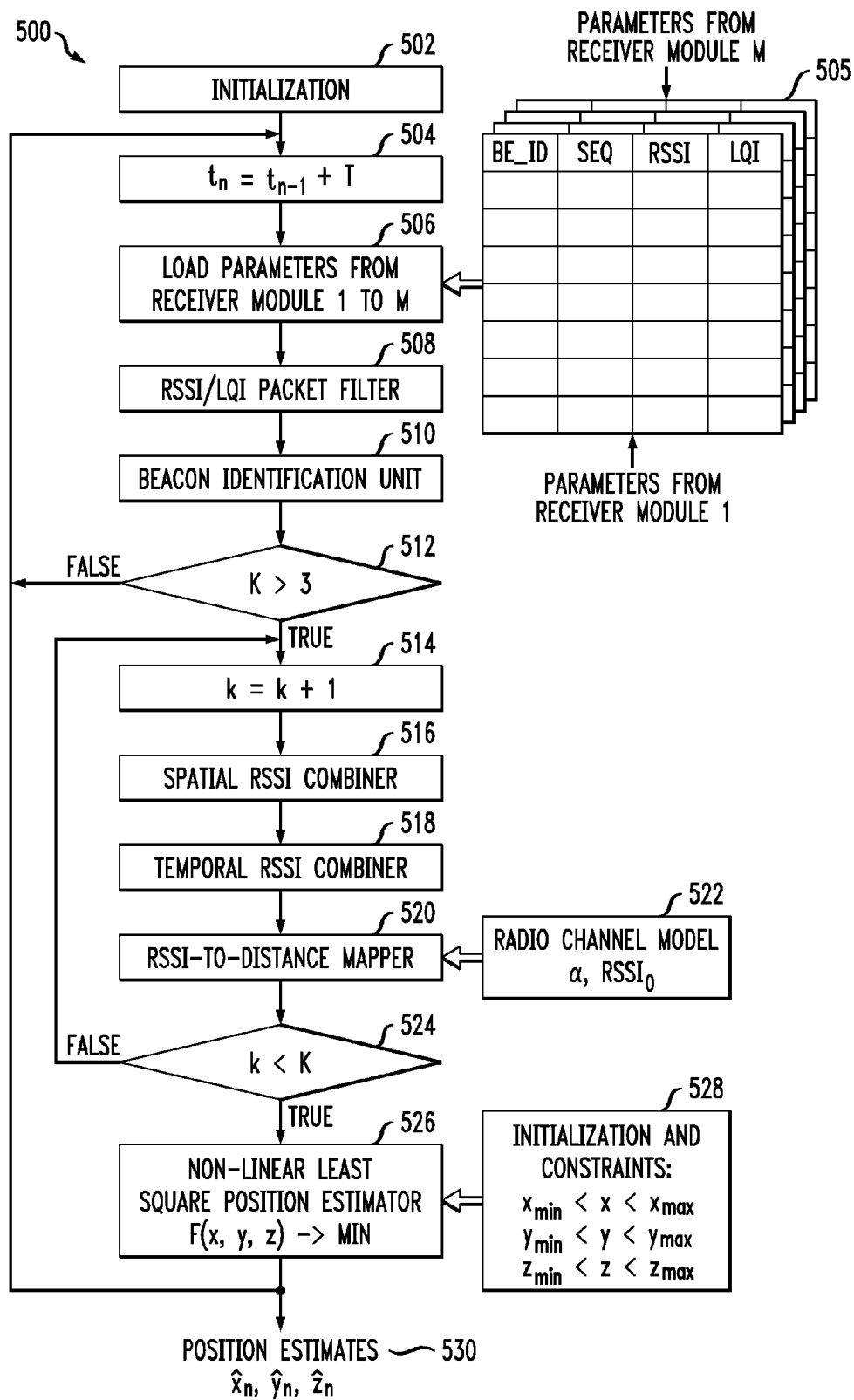
FIG. 5 shows an exemplary flow chart of signal processing functions, according to an even further aspect of the invention.

FIG. 5 shows an exemplary flow diagram 500 of signal processing functions which are executed on the location positioning engine to periodically provide estimates of the location of the mobile object 108 to the user. Before the location positioning engine can start operating, initialization has to be performed, as at block 502, by loading the location position of the beacons into memory, setting the thresholds RSSI$_{thres}$ and LQI$_{thresh}$ to proper quality values, and selecting a suitable time window T. The parameter 1/T defines how frequently the engine will update location position estimates.

After its initialization, time is incremented as shown at block 504, and the engine starts processing all parameter vectors, $v^{(m)}$, numbered 505, that have been downloaded by the receiver modules m, m=1,K,M, the modules being numbered as 452, to the memory of the location positioning engine during the observation time window T, as shown at block 506. Firstly, the RSSI/LQI packet filter 508 discards all vectors that have been obtained from packets with a received signal strength RSSI$\leq$RSSI$_{thres}$ or a link quality LQI$\leq$LQI$_{thresh}$. Then, the beacon identifier 510 determines all beacons k, k=1,K,K, that have successfully transmitted one or more radio packets to the mobile object during the time window T. As shown at decision block 512, if the number K of different beacons 102 is less than four, in this embodiment, the search for a position is terminated because no position estimate can be found in this time interval T with the exemplary method, and processing flows back to block 504. However, if K>3, the engine continues its search by separately processing the set of parameter vectors $V_k^{(m)}$, which have been derived from packets received from beacon k, k=1,K,K, indicated by incrementing of k in block 514.

For each beacon k, k=1,K,K, the spatial and temporal RSSI combiner in blocks 516 and 518 calculates an average signal strength indicator $\overline{RSSI}_k$ based on the noisy RSSI measurements obtained from packets received by the receiver modules m, m=1,K,M, numbered 452. To obtain a good $\overline{RSSI}_k$ estimate with low error variance in a short time T, the spatial combiner firstly averages the RSSI$_k^{(m)}$ measurements that have been made in the receiver modules for radio packets with the same beacon identifier BE_ID and the same sequence number SEQ. Averaging is performed on a linear scale, as suggested by equation (1) above, as follows:

$$\tilde{R}\tilde{S}\tilde{S}\tilde{I}_k = 10\log_{10}\left(\frac{1}{M}\sum_{m=1}^{M} 10^{\frac{RSSI_k^{(m)}}{10}}\right) dB. \quad (2)$$

This operation significantly reduces the error variance of the signal strength estimate because the RSSI$_k^{(m)}$ values have been obtained from packets that have been sent over spatially uncorrelated (or at least weakly correlated) radio channels. If RSSI$_k^{(m)}$ values for packets with the same parameters BE_ID and SEQ are not provided by all receiver modules due to the presence of a deep fade in the respective radio channel, the obtained, but incomplete set of signal strength values is dropped or, alternatively, averaged to generate a suboptimal $\tilde{R}\tilde{S}\tilde{S}\tilde{I}_k$ estimate. In the end, the spatial RSSI combiner 516 will provide for each beacon k a fixed number of $\tilde{R}\tilde{S}\tilde{S}\tilde{I}_k$ estimates. These estimates are fed to the temporal RSSI combiner 518 which determines the final spatially and temporally averaged estimate $\overline{RSSI}_k$ by averaging, on a linear scale, all $\tilde{R}\tilde{S}\tilde{S}\tilde{I}_k$ values for the beacon k.

For each beacon k, k=1,K,K, the RSSI-to-distance mapper 520 determines estimates for the distances between the beacon k and the mobile object, using the averaged signal strength indicators $\overline{RSSI}_k$ provided by the spatial and temporal RSSI combiners 516, 518. The mapping is based on a radio channel model 522 that assumes an exponential decay of the mean signal strength with distance and the presence of random fluctuations around its mean due the superposition of multiple propagation paths. The model is given by:

$$RSSI(d) = RSSI_0 + \alpha 10\log_{10}\left(\frac{d}{d_0}\right) + X_\sigma, \quad (3)$$

where RSSI$_0$ is an RSSI value measured in dB at a reference distance d$_0$, $\alpha$ is the path-loss exponent, and X$_\sigma$ is a normally distributed random variable with mean zero and variance $\sigma^2$ that accounts for log-normal shadowing. Since the parameters RSSI$_0$, $\alpha$, and $\sigma$ take on different values depending on the environment, the parameters that best describe the path loss in the location estimation area have to be determined in a site survey before performing location positioning. These model parameters can be found by collecting a large number of RSSI values for multiple measurement locations and transmitter-receiver separations, and minimizing the mean square error between the measured data and the predicted values. On the basis of this model, the distance d$_k$ between the beacon k and the mobile object can be estimated as:

$$\hat{d}_k = d_0 10^{\frac{1}{10\alpha}(\overline{RSSI}_k - RSSI_0)} \quad (4)$$

After having determined estimates $\hat{d}_k$ for the distances between the mobile object and all beacons k, k=1,K,K, as indicated by decision block 524 (looping back to block 514 until all beacons are addressed), the non-linear position estimator 526 iteratively searches for the coordinates (x,y,z) of the unknown location of the mobile object 108. The exact distances d$_k$ are given by the non-linear equations:

$$(x-x_k)^2+(y-y_k)^2+(z-z_k)^2=d_k^2 \text{ for } k=1,\ldots,K. \quad (5)$$

This set of equations indicates that the unknown position (x,y,z) can be found as the point of intersection of K spheres, where K>3 is mandatory, in the illustrative embodiment, to ensure the existence of a unique solution. Each sphere is centered at the known position of the k$^{th}$ one of the beacons. Since only approximate distances are available, in one or more embodiments, an iterative search for the location is performed by minimizing the sum of mean square errors between the exact and approximate distance values, as follows:

$$F(x,y,z) = \sum_{k=1}^{K} \left(((x-x_k)^2 + (y-y_k)^2 + (z-z_k)^2)^{1/2} - \hat{d}_k\right)^2. \quad (6)$$

The formulation of the location positioning as a numerical non-linear optimization problem allows taking into account the constraints on the location estimation area as imposed by the floor plan of the building, as per block 528, namely:

$$x_{min}\leq x\leq x_{max}, y_{min}\leq y\leq y_{max}, z_{min}\leq z\leq z_{max}. \quad (7)$$

This constrained non-linear optimization problem can be solved with various iterative search techniques, as will appreciated by the skilled artisan given the teachings herein; for example, with a Newton conjugate gradient technique. To obtain fast and reliable convergence to the minimum, a good initial value for the search should be selected, which lies within the pre-defined location estimation area. Such an estimate can be found, for example, by linearizing the non-linear system of equation (5) and solving it by applying a linear least square method. The final position estimate is depicted at 530.

In view of the above discussion, it will be appreciated that an exemplary embodiment of an apparatus is provided for estimating the location of an object using a plurality of radio beacons 102 deployed at known positions over a location estimation area 104. Each given one of the beacons 102 is configured to periodically transmit a radio packet 200 including (i) an identifier 204 unique to the given one of the beacons 102 and (ii) a unique sequence number 206. The apparatus includes a plurality of antennas 110, each having an output. The apparatus also includes a memory (for example, memory 454) and one or more processors, coupled to the memory 454 and the antenna outputs. The processor(s) may implement functionality described with regard to the receiver 106, including modules 454 and the engine functionality shown in FIG. 5, thus being operative to monitor incoming packets 200 and, upon receipt of a packet from the $k^{th}$ one of the beacons, to measure the received signal strength, RSSI, measured at each of the antenna outputs; decode the packet to obtain the unique identifier and the unique sequence number; and spatially average (e.g., with equation (2)) the received signal strength at each of the antenna outputs, as at block 516. This process can be repeated for a plurality of additional packets from the $k^{th}$ one of the beacons during a pre-defined time window T, to obtain a plurality of spatially averaged received signal strengths. As discussed with regard to block 518, the processor(s) are operative to temporally average the plurality of spatially averaged received signal strengths over the pre-defined time window T, to obtain a spatially and temporally averaged value of the received signal strength. The distance $d_k$ from the apparatus to the $k^{th}$ one of the beacons is approximated by the processor(s) based on the spatially and temporally averaged value of received signal strength. The approximate distance $d_k$ is designated as $\hat{d}_k$. This procedure has to be repeated for all beacons $k=1, \ldots, K$, (K>3 for the general three-dimensional case), which have successfully transmitted one or more radio packets to the object during the time window, and, secondly, the nonlinear position estimator has to search for the coordinates of the unknown location of the object.

Note that the aforementioned processor may be, but is not necessarily, a general-purpose processor; specialized signal processors, application-specific integrated circuits (ASICs), and the like, may be employed.

As noted, in a general three-dimensional case, the apparatus is configured for use with at least four radio beacons. However, in some instances, less than four radio beacons could be used, when there were one or more additional constraints; e.g., on a single floor, tethered, on a conveyor belt, etc. In particular, note that as shown in FIG. 1 L radio beacons are deployed over the location estimation area. L depends on the size of the building and in one or more embodiments, may typically be 10, 20 or even higher. The parameter K defines the number of beacons that have successfully transmitted one or more radio packets to the object during the given time window. If a search is performed in the three dimensional coordinate system (x,y,z), K>3 beacons are needed, otherwise the location position cannot be uniquely determined. If packets are received from more than four stations, the performance of the inventive techniques can be improved. If the mobile object is moved on a flat floor, and thus constrained to substantially planar motion, the search has to be performed in the two-dimensional coordinate system (x,y). Consequently, it is necessary to receive packets from K>2 beacons. If the mobile object is moved on a conveyor belt, and thus constrained to substantially linear motion, the search has to be performed in the one-dimensional coordinate system (x). Consequently, it is necessary to receive packets from K>1 beacons.

In another aspect, a wireless system for estimating location of an object includes the plurality of radio beacons 102 deployed at known positions over a location estimation area, as well as the above-described apparatus. Note that, in the example shown, the apparatus including element 106 was used to locate another object, namely, cart 108; however, element 106 may be a self-contained unit and its position, rather than that of a separate object to which it is secured, may be the position of interest.

In yet another aspect, a method for estimating the position of an object uses a plurality of radio beacons as described above. The method includes the steps of securing to the object an apparatus as described above, and monitoring, with the apparatus, for incoming packets. Upon receipt of a packet from a $k^{th}$ one of the beacons, the steps described above, e.g., with regard to FIG. 5, can be carried out.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps. The aforementioned elements 106, 452, and the functionality in FIG. 5 can be implemented, for example, in hardware, software, a combination thereof, as one or more processors running software in one or more memories, and so on.

Figure 6:
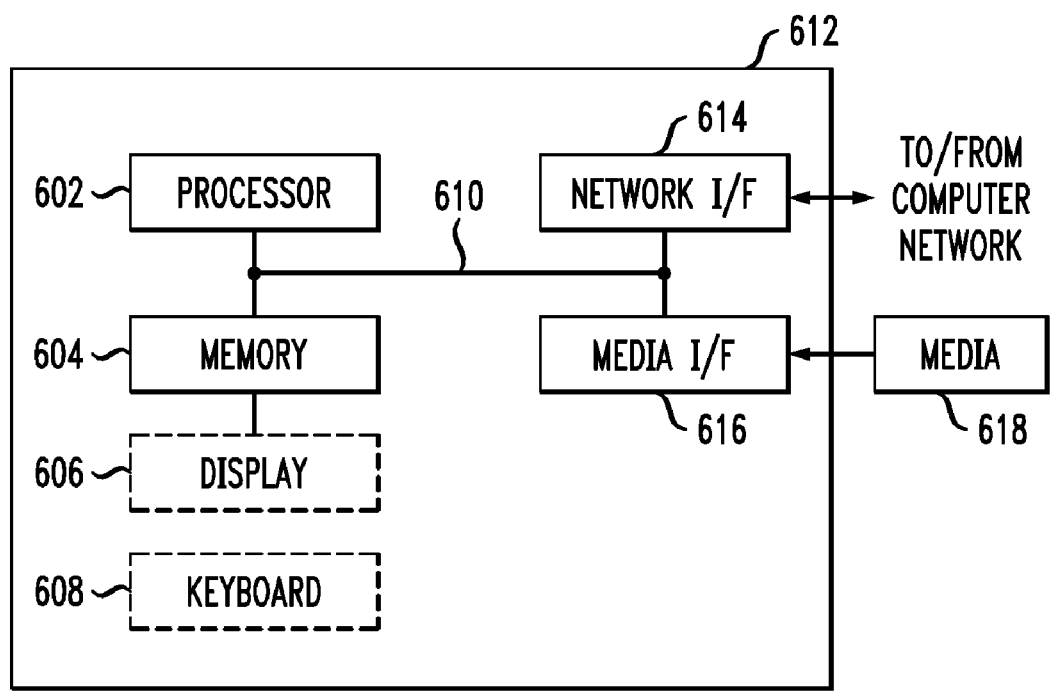
FIG. 6 depicts a computer system that may be useful in implementing one or more aspects and/or elements of the present invention.

One or more embodiments can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 618) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a computer-readable medium include a semiconductor or solid-state memory (for example memory 604), magnetic tape, a removable computer diskette (for example media 618), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code includes at least one processor 602 coupled directly or indirectly to memory elements 604 through a system bus 610. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An apparatus for estimating location of an object by monitoring radio packets, said packets being periodically transmitted by a plurality of radio beacons deployed at known positions over a location estimation area, said packets comprising (i) an identifier unique to a given one of the beacons and (ii) a unique sequence number, said apparatus comprising:

a plurality of antennas, each of said antennas having an output;
a memory; and
at least one processor, coupled to said memory and said antenna outputs, said processor being operative to carry out the following steps for k=1 to K:
monitor for incoming ones of the packets;
upon receipt of a packet from a $k^{th}$ one of the beacons:
measure received signal strength, RSSI, at each of said antenna outputs;
decode the packet to obtain the unique identifier and the unique sequence number; and
spatially average the received signal strength at each of said antenna outputs;
repeat said measuring, decoding, and spatial averaging steps for a plurality of additional packets from the $k^{th}$ one of the beacons during a pre-defined time window T, to obtain a plurality of spatially averaged received signal strengths;
temporally average the plurality of spatially averaged received signal strengths over the pre-defined time window T, to obtain a spatially and temporally averaged value of received signal strength; and
approximate a distance $d_k$ from said apparatus to the $k^{th}$ one of the beacons based on the spatially and temporally averaged value of received signal strength, the approximate distance $d_k$ being designated as $\hat{d}_k$;
said processor being further operative to estimate the location as an approximate intersection of spheres with radii $\hat{d}_k$, each centered at the known position of the $k^{th}$ one of the beacons;
wherein K is at least two in a case where said object is constrained to move in a single spatial dimension, K is at least three in a case where said object is constrained to move in two spatial dimensions, and K is at least four in a case where said object is free to move in three spatial dimensions, and wherein K comprises a number of said beacons that have successfully transmitted one or more of said radio packets to the object during the time window T.

2. The apparatus of claim 1, wherein said processor is operative to approximate the distance $d_k$ to the $k^{th}$ one of the beacons by an exponential path loss model of a radio channel associated with the $k^{th}$ one of the beacons.

3. The apparatus of claim 2, wherein said processor is operative to estimate the location by applying an iterative search technique which minimizes sum of mean square errors between exact distance values $d_k$, k=1,K,K, and the approximate distance values $\hat{d}_k$, k=1,K,K.

4. The apparatus of claim 3, wherein said exponential path loss model is given by:

$$RSSI(d) = RSSI_0 + \alpha 10\log_{10}\left(\frac{d}{d_0}\right) + X_\sigma,$$

where:
- $RSSI_0$ is a received signal strength value measured in dB at a reference distance $d_0$,
- $\alpha$ is a path-loss exponent, and
- $X_\sigma$ is a normally distributed random variable with mean zero and variance $\sigma^2$.

5. The apparatus of claim 4, wherein the approximate distance values $\hat{d}_k$, k=1,K,K are given by:

$$\hat{d}_k = d_0 10^{\frac{1}{10\alpha}(\overline{RSSI}_k - RSSI_0)},$$

$\overline{RSSI}_k$ is said spatially and temporally averaged value of the received signal strength.

6. The apparatus of claim 3, wherein said minimization of said mean square error comprises minimizing a quantity given by:

$$F(x, y, z) = \sum_{k=1}^{K} \left(((x-x_k)^2 + (y-y_k)^2 + (z-z_k)^2)^{1/2} - \hat{d}_k\right)^2$$

wherein x, y, and z are approximate spatial coordinates of the location of said object and $x_k$, $y_k$, and $Z_k$ are spatial coordinates of the $k^{th}$ one of the beacons.

7. The apparatus of claim 1, wherein there are M of said antennas and wherein said processor is operative to perform said spatial averaging by applying the formula:

$$\tilde{R}\tilde{S}\tilde{S}\tilde{I}_k = 10\log_{10}\left(\frac{1}{M}\sum_{m=1}^{M} 10^{\frac{RSSI_k^{(m)}}{10}}\right) dB.$$

8. A wireless system for estimating location of an object, said system comprising:
a plurality of radio beacons deployed at known positions over a location estimation area, each given one of said beacons being configured to periodically transmit radio packets comprising (i) an identifier unique to said given one of said beacons and (ii) a unique sequence number; and
an apparatus comprising:
a plurality of antennas, each of said antennas having an output;
a memory; and
at least one processor, coupled to said memory and said antenna outputs, said processor being operative to carry out the following steps for k=1 to K:
monitor for incoming ones of said packets;
upon receipt of a packet from a $k^{th}$ one of said beacons:
measure received signal strength, RSSI, at each of said antenna outputs;
decode said packet to obtain said unique identifier and said unique sequence number; and
spatially average said received signal strength at each of said antenna outputs;
repeat said measuring, decoding, and spatial averaging steps for a plurality of additional packets from said $k^{th}$ one of said beacons during a pre-defined time window T, to obtain a plurality of spatially averaged received signal strengths;
temporally average said plurality of spatially averaged received signal strengths over said pre-defined time window T, to obtain a spatially and temporally averaged value of received signal strength; and
approximate a distance $d_k$ from said apparatus to said $k^{th}$ one of said beacons based on said spatially and temporally averaged value of received signal strength, said approximate distance $d_k$ being designated as $\hat{d}_k$;
said processor being further operative to estimate the location as an approximate intersection of spheres with radii $\hat{d}_k$, each centered at the known position of the $k^{th}$ one of the beacons;
wherein K is at least two in a case where said object is constrained to move in a single spatial dimension, K is at least three in a case where said object is constrained to move in two spatial dimensions, and K is at least four in a case where said object is free to move in three spatial dimensions, and wherein K comprises a number of said beacons that have successfully transmitted one or more of said radio packets to the object during the time window T.

9. A method for estimating location of an object by monitoring radio packets, said packets being periodically transmitted by a plurality of radio beacons deployed at known positions over a location estimation area, said packets comprising (i) an identifier unique to a given one of the beacons and (ii) a unique sequence number, said method comprising the steps of:
securing to said object an apparatus comprising:
a plurality of antennas, each of said antennas having an output;
a memory; and
at least one processor, coupled to said memory and said antenna outputs; carrying out the following steps for k=1 to K:
monitoring, with said apparatus, for incoming ones of the packets;
upon receipt of a packet from a $k^{th}$ one of the beacons:
measuring received signal strength, RSSI, at each of said antenna outputs;
decoding the packet to obtain the unique identifier and the unique sequence number; and
spatially averaging the received signal strength at each of said antenna outputs;
repeating said measuring, decoding, and spatial averaging steps for a plurality of additional packets from the $k^{th}$ one of the beacons during a pre-defined time window T, to obtain a plurality of spatially averaged received signal strengths;
temporally averaging the plurality of spatially averaged received signal strengths over the pre-defined time window T, to obtain a spatially and temporally averaged value of received signal strength;
approximating a distance $d_k$ from said apparatus to the $k^{th}$ one of the beacons based on the spatially and temporally averaged value of received signal strength, the approximate distance $d_k$ being designated as $\hat{d}_k$; and estimating the location as an approximate intersection of spheres with radii $\hat{d}_k$, each centered at the known position of the $k^{th}$ one of the beacons;

wherein K is at least two in a case where said object is constrained to move in a single spatial dimension, K is at least three in a case where said object is constrained to move in two spatial dimensions, and K is at least four in a case where said object is free to move in three spatial dimensions, and wherein K comprises a number of said beacons that have successfully transmitted one or more of said radio packets to the object during the time window T.

10. The method of claim 9, wherein said approximating the distance $d_k$ to the $k^{th}$ one of the beacons comprises approximating by an exponential path loss model of a radio channel associated with the $k^{th}$ one of the beacons.

11. The method of claim 10, wherein said estimating said location comprises applying an iterative search technique which minimizes sum of mean square errors between exact distance values $d_k$, k=1,K,K, and the approximate distance values $\hat{d}_k$, k=1,K,K.

12. The method of claim 11, wherein said exponential path loss model is given by:

$$RSSI(d) = RSSI_0 + \alpha 10\log_{10}\left(\frac{d}{d_0}\right) + X_\sigma,$$

where:
$RSSI_0$ is a received signal strength value measured in dB at a reference distance $d_0$,
$\alpha$ is a path-loss exponent, and
$X_\sigma$ is a normally distributed random variable with mean zero and variance $\sigma^2$.

13. The method of claim 12, wherein the approximate distance values $\hat{d}_k$, k=1,K,K are given by:

$$\hat{d}_k = d_0 10^{\frac{1}{10\alpha}(\overline{RSSI}_k - RSSI_0)},$$

where
$\overline{RSSI}_k$ is said spatially and temporally averaged value of the received signal strength.

14. The method of claim 11, wherein said minimization of said mean square error comprises minimizing a quantity given by:

$$F(x, y, z) = \sum_{k=1}^{K}\left(((x-x_k)^2 + (y-y_k)^2 + (z-z_k)^2)^{1/2} - \hat{d}_k\right)^2$$

wherein x, y, and z are approximate spatial coordinates of the location of said object and $x_k$, $y_k$, and $z_k$ are spatial coordinates of the $k^{th}$ one of the beacons.

15. The method of claim 9, wherein there are M of said antennas and wherein said spatial averaging comprises applying the formula:

$$\tilde{R}\tilde{S}\tilde{S}\tilde{I}_k = 10\log_{10}\left(\frac{1}{M}\sum_{m=1}^{M} 10^{\frac{RSSI_k^{(m)}}{10}}\right) dB.$$

* * * * *